United States Patent
Buente et al.

(10) Patent No.: US 7,764,029 B2
(45) Date of Patent: Jul. 27, 2010

(54) ACTIVATION CURRENT FOR DC MOTOR HAVING BRAKE AND EMERGENCY OPERATION SUPPLY UNIT

(75) Inventors: Andreas Buente, Rheda-Wiedenbrueck (DE); Lars Kauke, Froendenberg (DE); Dirk Fedder, Bochum (DE)

(73) Assignee: Moog Unna GmbH, Unna (DE)

( * ) Notice: Subject to any disclaimer, the term of this patent is extended or adjusted under 35 U.S.C. 154(b) by 395 days.

(21) Appl. No.: 11/873,028

(22) Filed: Oct. 16, 2007

(65) Prior Publication Data
US 2008/0129234 A1    Jun. 5, 2008

(30) Foreign Application Priority Data
Oct. 17, 2006    (DE) ................. 10 2006 049 490

(51) Int. Cl.
*H02P 1/54*    (2006.01)
(52) U.S. Cl. ............... 318/105; 318/106; 318/362; 318/370
(58) Field of Classification Search ............ 318/105, 318/106, 362, 370, 373, 374; 307/64, 85
See application file for complete search history.

(56) References Cited

U.S. PATENT DOCUMENTS

| | | | | |
|---|---|---|---|---|
| 6,239,513 B1 * | 5/2001 | Dean et al. | ............... | 307/64 |
| 6,486,627 B1 * | 11/2002 | Gabrys | ............... | 318/161 |
| 7,088,073 B2 * | 8/2006 | Morishita | ............... | 318/801 |
| 7,116,066 B2 * | 10/2006 | Lin | ............... | 318/108 |
| 7,301,301 B2 * | 11/2007 | Nagatsuka et al. | ............... | 318/801 |

FOREIGN PATENT DOCUMENTS

| | | |
|---|---|---|
| DE | 297 22 109 | 12/1997 |
| DE | 298 15 497 | 8/1998 |
| DE | 102 53 811 | 11/2002 |
| DE | 103 35 575 | 7/2003 |
| DE | 103 38 127 | 8/2003 |
| EP | 1 303 034 | 9/2002 |

* cited by examiner

*Primary Examiner*—Bentsu Ro
*Assistant Examiner*—Thai Dinh
(74) *Attorney, Agent, or Firm*—Quarles & Brady LLP

(57) ABSTRACT

An activation circuit and a method for operating an activation circuit for a DC motor having an electrically actuated stopping brake, in particular for adjusting a rotor blade of a wind or water power facility. The activation circuit includes an emergency operation supply unit and a three-phase bridge inverter. The emergency operation supply unit is connected so it is disconnectable via an emergency operation network switching element to the intermediate circuit of the three-phase bridge inverter, the DC motor is connected via an emergency operation motor changeover element either to the three-phase bridge inverter or to the emergency operation supply unit, and the stopping brake is connected via an emergency operation brake changeover element either to the three-phase bridge inverter or to the emergency operation supply unit.

35 Claims, 2 Drawing Sheets

US 7,764,029 B2

ACTIVATION CURRENT FOR DC MOTOR HAVING BRAKE AND EMERGENCY OPERATION SUPPLY UNIT

CROSS-REFERENCE TO RELATED APPLICATION

This application claims priority to DE Patent Application 10 2006 049 490.3, filed 17 Oct. 2006, and is incorporated by reference herein.

STATEMENT CONCERNING FEDERALLY SPONSORED RESEARCH OR DEVELOPMENT

Not Applicable.

FIELD OF THE INVENTION

The present invention relates to an activation circuit for operating a DC motor having an electrically actuated stopping brake, in particular for adjusting a rotor blade of a wind or water power facility, which comprises an emergency operation supply unit and a three-phase bridge inverter. Furthermore, the present invention relates to a method for operating such an activation circuit.

BACKGROUND OF THE INVENTION

One focus of use of the activation circuit is in the field of adjustment mechanisms for rotor blades, as are used, for example, in wind or water power facilities. They are used for the purpose of changing the attack angle of one or more rotor blades in relation to the flowing drive medium air or water in such a way that on one hand optimal efficiency of the power generating facility may be achieved, and on the other hand, in case of malfunction, the drive face of the rotor blades may be pivoted in relation to the drive flow into a neutral position (feathering position), so that the power generating facility may be put into an idle position. The requirement exists in this case that the required activation circuit allows at least emergency running operation even in the event of diverse malfunctions and supports fixing the rotor blades. The field of use of the activation circuit is not restricted to this area, it may also be used in other fields of technology.

In the above-mentioned usage case, three-phase current and/or DC motors are typically used. The activation circuits employed for this purpose comprise inverters in the case of three-phase current motors, such as frequency converters or servo controls, which may control the motor speeds. For this purpose, these converters are typically constructed as three-phase for asynchronous or synchronous three-phase current motors, one half-bridge being used for each motor phase, which typically comprises two power transistors, e.g., insulated gate bipolar transistors (IGBTs) and possibly two freewheeling diodes. The three phases of the power network are converted via a bridge rectifier into DC voltage for the power supply of such rotor blade adjustment devices based on three-phase current, and this DC is led to the three half-bridges of the inverter. Therefore, three types of voltage may be differentiated in these known activation circuits: the network voltage, the intermediate circuit DC voltage, and the arbitrarily controllable output voltage of the inverter.

Multiple implementations and variants of such an activation circuit are known from the prior art. Thus, for example, it is typical that both DC and also three-phase current motors may be used for the adjustment of rotor blades. The suggestion exists for this purpose that multiple DC and/or three-phase current motors may be used for one adjustment device of a single rotor blade. If three-phase current motors are used, a braking and stopping effect of the motors on the rotor blade may be achieved with the aid of a DC applied to the three-phase current motors, so that additional stopping brakes may be saved.

In addition, it is also typical to use mechanical motor brakes for stopping an electric drive, which are electromagnetically actuated in many cases and are coupled to the shaft of the motor. Such electromagnetically actuated stopping brakes may be operated in the range from extra-low voltage up to network voltage using DC or also AC voltage. Additional components are necessary for this purpose in many possible implementations, such as power supply units or cooling devices. The stopping brakes typically block in the unpowered state and open in the powered state. Special switch contacts for extra-low voltage, which directly support the activation function of such a stopping brake, are provided for operating such a stopping brake in commercially available converters, for example, in frequency converters or servo controls. In many cases, however, an external power source is required to operate a stopping brake, in order to provide the required operating voltage to the stopping brake. In this regard, operating stopping brakes using pulse-width-modulated activation voltages is known from the prior art, to adapt the available network voltage, intermediate circuit voltage, or motor voltage for the employed stopping brake and thus operate the stopping brake. Such pulse-width-modulated activation reduces the number of required additional circuits for the braking system, because no additional power sources or power supply units are required.

A high degree of operational reliability is absolutely required precisely in drive devices for rotor blades of power generating machines. Suggestions exist that upon the occurrence of a malfunction, the rotor blades may be moved into a neutral state with the aid of an emergency operation supply unit, so that the rotor blade assumes a feathering position, in which it does not offer any resistance to the flowing medium. Technical implementations exist for this purpose, which use a DC motor for the rotor adjustment, which pivots the rotor into a feathering position via an emergency battery in case of malfunction. Proceeding from this variant, activation circuits have been developed in which the emergency operation supply unit may be coupled either directly or indirectly via an activation circuit/an inverter to the DC motor. Such activation circuits offer the advantage that on one hand, upon breakdown of the inverter the DC motor may be operated directly via the emergency operation supply unit, on the other hand, during operation via the inverter, targeted control of the motor is possible, for example, via pulse width modulation. An alteration of this concept known from the prior art is to use a three-phase current motor instead of a DC motor. However, only coupling the operating voltage of the emergency operation supply unit in via the intermediate circuit of the inverter comes into consideration, because the DC voltage of the emergency operation supply unit must first be converted into three-phase current. In an alternative concept, the use of an inverter is dispensed with, so that only the possibility of making the emergency operation supply unit connectable directly to a DC motor exists.

Finally, it is known from the prior art that a DC motor having series and shunt windings is used for an adjustment device of a rotor blade, which is activated via a three-phase bridge inverter, as is typically used for activating three-phase current motors.

The possible implementations for activation circuits described above, in particular for adjusting rotor blades of wind or water power facilities, achieve specific objects of such adjustment devices and require multiple specialized components and special circuit technologies for this purpose.

Thus, for example, the use of three-phase current motors for an adjustment device and implementing the stopping function by DC powering of the three-phase current motors requires a special circuit for providing the DC voltage and a special controller, which performs the changeover between three-phase current operation and holding current operation. DC powering of a three-phase current motor has the disadvantage of restricted and often too low stopping and braking action in holding current operation. Furthermore, such a brake implementation is not intrinsically reliable, i.e., in case of malfunction, for example in the event of a motor defect, the danger exists that the stopping and braking action will break down completely, so that the rotor blade moves uncontrolled and may cause further damage.

For this reason, using separate stopping brakes, which may exert sufficiently high braking and stopping forces and offer a higher intrinsic reliability, is known. However, controlling these separate stopping brakes, typically by pulse-width-modulated control voltages, requires additional components, which generate the pulse-width-modulated voltages, as well as a separate control device, which activates the stopping brakes.

The combination of drive device with the aid of three-phase current motors and emergency operation supply units, which typically only provide DC voltage, requires the use of an extremely reliable and failsafe DC/AC converter and thus increases the overall costs of the activation circuit.

For this purpose, operating a DC motor via an inverter in which an emergency operation supply unit may be applied both directly to the DC motor and also indirectly via the inverter to the DC motor, is known. However, such an activation circuit requires the development and implementation of a special inverter for DC operation, which comprises at least two half-bridges. Furthermore, the problem results that a stopping brake, which is required in many cases, is not provided integrated in this concept.

Alternatively thereto, a concept which couples the emergency operation supply unit solely directly to the DC motor in case of fault does not allow defined control of the DC motor, so that the emergency operation of the adjustment device may only be performed by turning the DC motor on and off in binary form.

Finally, the operation of a DC motor having series and shunt windings via a three-phase bridge inverter does allow the operation of a DC motor, but not the use of an additional stopping brake or further actuators, without a separate activation circuit having to be added for this purpose.

SUMMARY OF THE INVENTION

Proceeding from this above-mentioned prior art, it is the object of the present invention to suggest an activation circuit for operating a DC motor having electrically actuated stopping brake, which comprises an emergency operation supply unit and a three-phase bridge inverter, which overcomes the above-mentioned disadvantages of the prior art and allows cost-effective, flexible, and robust activation of a rotor adjustment device in both normal and also emergency operation. Furthermore, it is the object of the present invention to allow controlled operation of the activation circuit for activating motor and stopping brake in both normal and also emergency operation with minimal circuit-technology complexity and low component count. A further object of the present invention is to suggest an activation circuit which allows central control and monitoring with low cabling outlay.

This object is achieved by an activation circuit for operating a DC motor having electrically actuated stopping brake, in particular for adjusting a rotor blades of a wind or water power facility, which comprises an emergency operation supply unit and a three-phase bridge inverter, characterized in that the emergency operation supply unit is connected so it is disconnectable via an emergency operation network switching element to the intermediate circuit of the three-phase bridge inverter, the DC motor is connected via an emergency operation motor changeover element either to the three-phase bridge inverter or to the emergency operation supply unit, and the stopping brake is connected via an emergency operation brake changeover element either to the three-phase bridge inverter or to the emergency operation supply unit and a method for operating such an activation circuit.

The activation circuit according to the present invention is characterized in that the emergency operation supply unit is connected via an emergency operation network switching element to the intermediate circuit of the three-phase bridge inverter so it is disconnectable, the DC motor is connected via an emergency operation motor changeover element either to the three-phase bridge inverter or to the emergency operation supply unit, and the stopping brake is connected via an emergency operation brake changeover element either to the three-phase bridge inverter or to the emergency operation supply unit. The activation circuit is used for controlling and regulating a DC motor for adjusting a rotor blade having associated electrically actuated stopping brake and allows operation, in the event of short-term breakdown of the supply voltage, for example, via an emergency operation supply unit both directly and also via the converter electronics. A standard three-phase bridge inverter is used in the converter electronics, which is typically used in three-phase current motors and is thus available in a great manifold for various power ranges. Therefore, with very high flexibility of possible circuit variants, the circuit dispenses with special components and implements its functional capabilities solely with the aid of cost-effectively available standard components. In principle, the activation circuit according to the present invention comprises a DC motor, a stopping brake, and an emergency operation supply unit, which are together connected to a three-phase bridge inverter. The emergency operation supply unit is connected directly via an emergency operation network switching element to the intermediate circuit of the three-phase bridge inverter, so that it may receive voltage via the intermediate circuit for operating and charging and also deliver voltage to the intermediate circuit. The DC motor is connected via an emergency operation motor changeover element either to the three bridge rectifier, or is connected, for example, in emergency operation, by changing over the emergency operation motor changeover element directly or possibly indirectly via an adaptation network, to the emergency operation supply unit. The stopping brake is connected via an emergency operation brake changeover element either directly to the three-phase bridge inverter, or to the emergency operation supply unit by changing over the changeover element—again directly or via an adaptation network. Therefore, various operating capabilities of the activation circuit exist. In normal operation, the emergency operation motor changeover element connects the DC motor directly to the three-phase bridge inverter, and the emergency operation rate changeover element connects the stopping brake directly to the three-phase bridge inverter. If a malfunction of the network voltage occurs, for example, the emergency operation supply unit may deliver voltage via the closed network switching element to the intermediate circuit through the network switching element, so that in this case the emergency operation supply unit operates the DC motor and the stopping brake via the network switching element and the three-phase bridge inverter. The changeover elements are not actuated in this case. In another malfunction scenario, the three-phase bridge inverter may break down, for example, by a lightning strike, and the emergency operation motor changeover element may connect the DC motor and the emergency operation brake changeover element may connect the stopping brake directly or via an adaptation network to the emergency operation supply unit, so that in the event of breakdown of the inverter, an emergency adjustment of the rotor blade into a feathering position, for example, may be ensured by power supply via the emergency operation supply unit.

In principle, the internal construction of the emergency operation supply unit is arbitrary. An advantageous embodiment of an emergency operation supply unit may comprise one or more batteries which supply the drive device with energy in case of a malfunction. Batteries are very favorably available in many power variants and have a long service life.

As an alternative to the use of one or more batteries, a chargeable DC voltage source may be contained in the emergency operation supply unit, particularly one or more accumulators, capacitors, or similar elements. These are used, for example, during the bridging of short-term voltage interruptions or voltage breakdowns so that the drive device may at least be moved into a neutral position, in case of a rotor drive device into a feathering position. A chargeable DC voltage source particularly offers the advantage of freedom from maintenance over a long time and regenerative charging after a prior malfunction.

If the emergency operation supply unit contains a chargeable power source, it is especially advantageous that it may be charged via the emergency operation network switching element. With a closed emergency operation network switching element, the emergency operation supply unit is connected to the intermediate circuit of the three-phase bridge inverter and a thus uses DC voltage to charge the power source. This allows maintenance-free operation of the emergency operation supply unit over long periods of time. For this purpose, the chargeable DC voltage source may have an adaptation network connected upstream, to perform and/or exert possible voltage adaptations and/or overload protection functions between intermediate circuit and DC voltage source.

In the case of breakdown of the power network, it is completely conceivable and advantageous that the emergency operation supply unit may power the intermediate circuit of the three-phase bridge inverter in reverse, directly or via further adaptation components. It is thus ensured that in the event of a breakdown of the external power supply, the drive device may be controlled via the inverter without influencing its functionality and thus the entire comfort of the circuit may also be used in case of a network breakdown. In this variant, trouble-free operation of the rotor adjustment device is also possible in the event of network breakdown, in addition, such a type of operation allows secure and smooth transfer of the rotor into a neutral position, for example, a feathering position, using the control capability of the inverter.

The monitoring, control, and regulation of the activation circuit may be implemented arbitrarily. In an especially simple and advantageous design of the present invention, the activation circuit comprises a central monitoring and control device, which is connected to at least one of the following switching elements: emergency operation network switching element, emergency operation motor changeover element, and/or emergency operation brake switching element, and implements at least one of the following functions: power supply of the emergency operation supply unit to and from the intermediate circuit of the inverter, power supply of the DC motor, power supply of the stopping brake. In this context, a control device is referred to, which may also assume regulating tasks, however, and may possibly also assume the control/regulation of the three-phase bridge inverter. The emergency operation supply unit represents a central component of the activation circuit, and allows various types of operation of the activation circuit by various settings of the switching and changeover elements. For this reason, it is obvious to house the higher-order monitoring and control device, which controls the setting of the switching and changeover elements to implement the various circuit configurations of the activation circuit, in the emergency operation supply unit. The various setting capabilities of the switching and changeover elements may thus be controlled from a central location, and the behavior of the activation circuit may be determined by defined tuning of the individual states of the actuators. In particular, the monitoring and control device is to be capable of turning off the emergency operation supply unit, on one hand to prevent an overload, and on the other hand, in emergency operation or in case of a malfunction, to stop the motor or stopping brake in emergency operation, i.e., disconnect them from the supply voltage.

If a central monitoring and control device is provided, it suggests itself that this be connected, in addition to the controller of the above-mentioned switching and changeover elements, to the three-phase bridge inverter, to control it. The monitoring and control device thus also controls, in addition to individual types of supply operation of DC motor and stopping brake, the individual power switching elements of the three-phase bridge inverter, so that it is obliged to perform the entire control of the activation circuit. The component outlay is significantly reduced and the cable guiding is simplified by such a central control device, furthermore, more monitored operation of the entire circuit is possible. It is thus conceivable, for example, to control the activation voltages of the motor and the brake in a monitored way before changeover of the supply voltages from normal to emergency operation, to ensure a smooth changeover.

The monitoring and control device may typically be implemented as a separate circuit component and be housed in the activation circuit. However, it is advantageously possible to integrate it in the emergency operation supply unit, in particular to simplify retrofitting of existing facilities, reduce the cabling outlay, and keep the number of components low.

The use of a monitoring and control device which controls all components of the activation circuit opens up the possibility of collecting all data of the activation circuit such as operating state, functional interference, etc., at a central location. Because increased safety of the activation circuit is in the foreground, it is advantageous that the monitoring and control device also comprises a remote signaling device for receiving and transmitting information at a remote monitoring and control location. This may relay the data of the activation circuit or execute instructions received from the remote monitoring and control location and thus increases the operational reliability of the activation circuit.

In a particularly outstanding embodiment of the activation circuit, the DC motor is connected via the emergency operation changeover element to two half-bridges of the three-phase bridge inverter. A DC motor typically has two motor connection terminals. The three-phase bridge inverter comprises three individual half-bridges, and thus has three motor terminals for connecting a three-phase current motor. It is entirely conceivable to connect one terminal of the DC motor to one half-bridge and the second terminal of the DC motor to an intermediate circuit potential, it is arbitrary whether the positive or negative potential of the intermediate circuit is used, however, in this case an additional polarity reversal circuit would be required for a rotational direction reversal. The possibility of connecting the two terminals of the DC motor to two half-bridges of the three-phase bridge inverter thus offers maximum flexibility during operation of the DC motor in regard to power and rotational direction control. Any arbitrary chronological mean value of the coil voltage between zero and the complete intermediate circuit voltage may thus be set by a free selection of the pulse/pause ratio of the transistors of the half-bridge, and the polarity of the motor voltage may be changed over by targeted activation of the individual power switching elements of the two half-bridges.

In principle, the stopping brake may be connected to any arbitrary terminal of the inverter and/or the intermediate circuit. In an especially outstanding exemplary embodiment, at least one terminal of the stopping brake is connected via the emergency operation brake changeover element to an intermediate circuit potential.

Furthermore, it is preferably possible that at least one terminal of the stopping brake is connected via the emergency operation brake changeover element to a half-bridge of the three-phase bridge inverter. If one combines these two circuit possibilities, a stopping brake is connected via the emergency operation brake changeover element on one hand to one of the two intermediate circuit potentials, and is connected on the other hand to a half-bridge of the three-phase bridge inverter. The stopping brake is thus controllable via a half-bridge of the three-phase bridge inverter. It is arbitrary in principle which of the two intermediate circuit potentials—positive or negative potential—the stopping brake is connected to. Any arbitrary voltage between zero and the entire intermediate circuit voltage may be used to activate the stopping brake by a free selection of the pulse/pause ratio of the transistors of the half-bridge. It remains open here whether the stopping brake is connected exclusively to a half-bridge, or whether other consumers, in particular the DC motor, are already connected to this half-bridge.

In regard to the activation of the stopping brake, it is advantageously possible that the half-bridge of the three-phase bridge inverter which is connected to the stopping brake is independent of the two half-bridges of the three-phase bridge inverter which are connected to the DC motor. Therefore, maximum flexibility in the activation of DC motor and stopping brake is obtained, so that different operating states and operating voltages may be set for both power consumers.

Alternatively to the activation of the stopping brake described above, it is also entirely conceivable that the half-bridge of the three-phase bridge inverter which is connected to the stopping brake is one of the half-bridges of the three-phase bridge inverter which are connected to the DC motor. DC motor and stopping brake thus divide one half-bridge of the three-phase bridge inverter, so that a remaining half-bridge is freely available and may fulfill additional circuit and regulating objects.

In some cases, the operation of a stopping brake requires additional components, in particular protective circuits, therefore, it is advantageous in an outstanding exemplary embodiment that further components, in particular a stopping brake protective circuit, are connected in parallel and/or in series to the stopping brake. Overloads of the stopping brake may be prevented, overvoltages may be compensated for, or overcurrents may be prevented by such a protective circuit, for example.

If the stopping brake is connected to at least one half-bridge of the three-phase bridge inverter, is especially advantageous that the stopping brake is operated using a chronologically changeable voltage mean value, in particular using a pulse-width-modulated voltage, during operation via the inverter. A chronologically arbitrarily adjustable mean value of the coil voltage may thus be set by a free selection of the pulse/pause ratio of the transistors of the half-bridge, which may assume any arbitrary value between zero and the entire intermediate circuit voltage. The possibility thus opens up of using stopping brakes having arbitrary rated voltages, in particular employing cost-effective extra-low voltage stopping brakes.

To increase the flexibility and for better monitoring of the activation circuit, it is advantageously possible that the activation circuit also comprises at least one current measuring unit. This current measuring unit may be used at arbitrary points of the activation circuit and monitors the flowing current, which permits conclusions about the operating behavior of the entire circuit or individual circuit areas. For this purpose, it is entirely conceivable to integrate the current measuring unit in the three-phase bridge inverter, this increases the operational reliability and reduces the circuit complexity of the activation circuit.

If at least one current measuring unit is used in the activation circuit, it is possible and advantageous that the current measuring unit is connected to a monitoring and control device for controlling the inverter and/or the emergency operation network switching elements, and/or the emergency operation motor changeover element and/or the emergency operation brake changeover element. The switching and changeover elements may thus be switched by analysis of the current detected by the current measuring unit in such a way that it is possible to regulate the activation circuit as a function of the current. For example, by monitoring the network current by the monitoring and control device, which may be housed in the emergency operation supply unit, for example, a breakdown of the network supply may be recognized, so that the emergency operation supply unit supplies the three-phase bridge inverter with voltage in reverse via the network switching element, and thus supplies the drive device with power. Furthermore, by targeted monitoring of currents within the inverter, a breakdown of the inverter may be recognized, so that the emergency operation supply unit initiates a changeover of the power supply of DC motor and stopping brake to direct supply by the emergency operation supply unit. Monitoring the motor or stopping brake current is also conceivable, so that these may be disconnected in the event of breakdown or overload of the supply voltages.

In particular, the use of a current measuring unit especially advantageously allows the current of the stopping brake to be measured, so that it is possible to regulate the activation current of the stopping brake by the monitoring and control device. The current of the stopping brake provides information about forces which act on the brake, such as increased wind load, or about overload of the stopping brake. By targeted monitoring of the stopping brake current, the drive device may thus be influenced in such a way that the rotor of a power plant facility may be moved into a more favorable angle or into a neutral position, such as the feathering position, for example, or that the breakdown of the stopping brake may be recognized in a timely manner. The measurement of the stopping brake current may also document the degree of aging and/or the wear of the brake by comparison with supply profiles. Furthermore, it gives a notification of the operating state of the brake, e.g., whether the brake has actually vented, and is used as an indicator for incorrect behavior. The analysis of the measured data provided by the current measuring unit is thus used directly for monitoring and controlling the activation circuit and, by comparison with supply profiles, may recognize functional state, malfunction, aging, wear, strain, and similar states of the DC motor and/or the stopping brake.

The internal embodiment of the DC motor is arbitrary in principle, one typically fundamentally differentiates between series, shunt, compound, or externally-excited DC motors. The DC motor of the activation circuit is especially advantageously equipped in that it comprises a motor shunt winding. The DC motor may be a series motor, for example, which has an additional shunt winding and may thus be operated in the form of a compound motor, for example.

If the DC motor has a shunt winding according to the alternative described above, it is especially advantageous if the motor shunt winding is connected in parallel to the stopping brake. The shunt winding is then only in operation when the stopping brake is in the powered state, i.e., the open state.

The shunt winding may increase or improve the twist torque of the DC motor, in particular when the rated voltage of the shunt winding corresponds with the rated voltage of the magnetic coil of the stopping brake. More cost-effective operation of the stopping brake is thus possible without further devices.

A separate shunt winding of the DC motor also allows operation of the motor as an externally-excited motor, in that the motor shunt winding is connected as an externally-excited winding of the DC motor. The DC motor thus opens up operational features similar to those of an externally-excited motor.

The motor shunt winding may be made between a terminal of the DC motor and a terminal of the stopping brake as a possible further circuit alternative of a shunt winding on the DC motor. The behavior of the shunt winding is thus a function of the activation of the DC motor and the activation of the stopping brake, so that, for example, with unpowered stopping brake, the shunt winding is put out of operation, and the shunt winding generates a small magnetic field at low voltages of the motor.

In many cases, auxiliary circuits are required during operation of shunt or externally-excited coils of the DC motor. For this reason, it is especially advantageous that additional components are connected in series and/or parallel to the motor shunt winding.

Furthermore, it is entirely possible and conceivable that the DC motor comprises a field rectifier in its interior, which is particularly connected before the series winding of a DC motor. A field rectifier thus allows the use of a series DC motor in 4-quadrant operation, so that braking or additional acceleration is made possible during running of the motor, for example.

The three-phase bridge inverter corresponds according to the present invention to a standard inverter as is used for three-phase current machines, for example, as for asynchronous or synchronous machines. The use of a three-phase bridge inverter which is part of a voltage intermediate circuit converter or servo control is especially advantageous, because it is available cost-effectively. Such servo controls or voltage intermediate circuit converters are available on the market in high piece counts, and thus especially cost-effectively, are very reliable, long-lived, and represent an industry standard.

In a special embodiment, the construction of the half-bridges of the inverter is distinguished in that at least two insulated gate bipolar transistors (IGBTs) are used as power switching elements. IGBTs are distinguished by an extremely low intrinsic consumption at high switchable outputs, and are the de facto standard in power electronics for activating DC, AC, and three-phase current machines.

The components of the activation circuit described above open up manifold conceivable operating states. Fundamentally, three basic types of operation may be differentiated in a method for operating the activation circuit: normal operation having power supply through the network, first emergency operation having unrestricted functionality of the activation circuit, and second emergency operation having restricted functionality of the activation circuit, because control does not occur via the three-phase bridge inverter. In the emergency operation types, the power supply of the activation circuit occurs via the emergency operation supply unit. An advantageous circuit-technology method for setting the three types of operation is described in the following:

Normal operation: the emergency operation network switching element is closed as needed to charge the emergency operation supply unit through the intermediate circuit and is otherwise open. The emergency operation motor changeover element connects the DC motor to the three-phase bridge inverter, and emergency operation brake changeover element connects the stopping brake to the three-phase bridge inverter;

First emergency operation: in first emergency operation, the three-phase bridge inverter remains functional and is used for the purpose of activating motor and brake. For this purpose, the emergency operation network switching element is closed to supply the intermediate circuit with voltage. The emergency operation motor changeover element connects the DC motor to the three-phase bridge inverter, and the emergency operation brake changeover element connects the stopping brake to the three-phase bridge inverter;

Second emergency operation: in second emergency operation, the three-phase bridge inverter is bypassed, i.e., motor and brake are supplied with power directly from the emergency operation supply unit. The emergency operation network switching element is open. The emergency operation motor changeover element connects the DC motor to the emergency operation supply unit, and the emergency operation brake changeover element connects the stopping brake to the emergency operation supply unit.

With the aid of the method outlined above, three basic types of operation may be differentiated, which allow robust emergency operation of the activation circuit in possible malfunction situations (breakdown of network—first emergency operation, breakdown of inverter and/or network—second emergency operation). However, deviations therefrom are conceivable, thus, for example, the DC motor may be powered directly by the emergency operation supply unit, while the stopping brake may still be controlled via the three-phase bridge inverter and vice versa.

The method described above for operating the activation circuit is to be performed by a control unit. For this purpose, it suggests itself that the control sequence be performed by the above-mentioned monitoring and control device, so that this performs the control of the individual operation types: normal operation, first emergency operation, and second emergency operation.

The monitoring and control device may additionally advantageously control the power switching elements of the half-bridges of the three-phase bridge inverter. Therefore, it represents the central monitoring and control device, which also assumes the control of the three-phase bridge inverter in addition to the operation type changeover and thus detects a breakdown of this component and may perform an operation type changeover. This additionally reduces control components and makes the circuit easier to implement.

In an outstanding exemplary embodiment, the activation circuit comprises power measuring units. In this case, in an advantageous embodiment, the control of the power switching elements may be performed in consideration of the measured data of at least one power measuring unit. By considering the recorded current, the breakdown of circuit components, overload, or other relevant variables may be recognized by the monitoring and control device and an operation type changeover may occur. Therefore, it is obvious that the selection of the individual operation types normal operation, first emergency operation, and second emergency operation is performed in consideration of the measured data of at least one current measuring unit.

Proceeding from an exemplary embodiment in which a monitoring and control device considers measured currents, it is entirely conceivable that the monitoring and control device compares the current measured by at least one of the current measuring units to stored setpoint profiles and ascertains information therefrom about functional state, malfunction, aging, wear, strain, and/or similar states of the DC motor and/or the stopping brake. The monitoring and control device may thus also ascertain analyses about wear, malfunction, strain, etc. of the motor and brake and consider them in the control and/or relay them, in addition to the sole task of control.

In the following, the present invention is explained in greater detail on the basis of drawings, which solely show exemplary embodiments. The figures show electrical circuits of multiple exemplary embodiments, only components of the activation circuit relevant to the embodiment being shown. Further typical circuit components which would be needed for an implementable circuit design, such as rectifier circuit for network voltage supply for the intermediate circuit, freewheeling diodes for the IGBTs, pre-charging circuit for the smoothing and buffer capacitor of the intermediate circuit, or further components typical in circuits known to those skilled in the art are not shown in the figures for reasons of clarity, but must be considered in addition for a complete circuit implementation.

DETAILED DESCRIPTION OF THE PREFERRED EMBODIMENT

Figure 1:
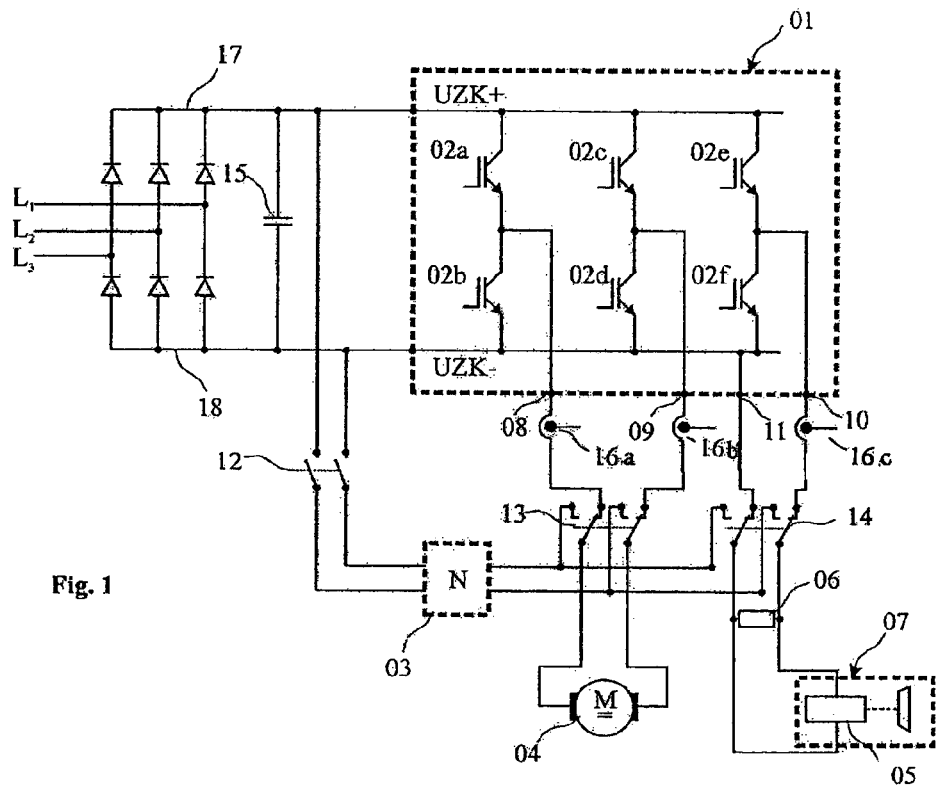
FIG. 1 shows a circuit design of a first exemplary embodiment of an activation circuit.

FIG. 1 shows the topology and electrical wiring of an exemplary embodiment according to the present invention.

The intermediate circuit of the activation circuit may be powered in this case via a network voltage. For this purpose—not shown—the three phases of a three-phase current network supply may be rectified via a bridge rectifier, which comprises six diodes, so that these supply the two intermediate circuit potentials UZK+ 17 and UZK− 18. However, electronic switching power supply units, transformational DC voltage power supply units, or other typical rectifier circuits are also conceivable as the rectifier circuit. Instead of a 3-phase three-phase current network, a 1-phase AC voltage may also be rectified to supply the intermediate circuit with voltage.

This intermediate circuit DC voltage is conducted as the intermediate circuit potentials 17 and 18 to the three-phase bridge inverter 01. An intermediate circuit capacitor 15 is used for smoothing the rectified voltage.

The three-phase bridge inverter 01 comprises three half-bridges, which each comprise two power switching elements 02, which are connected in series between the two intermediate circuit potentials 17 and 18. The inverter terminals 8, 9, and 10 are led outward by tapping between the two power switching elements 02 of each half-bridge. The power switching elements 02a and 02b represent one half-bridge, as do the two power switching elements 02c, 02d and 02e, 02f. Furthermore, the three-phase bridge inverter 01 has a terminal 11 of the DC voltage potential UZK−. Arbitrary voltage signals may be generated at the inverter terminal outputs 8, 9, and 10 in relation to one another or in relation to the intermediate circuit potential by suitable activation signals of the individual power switching elements. For example, if transistor 2a is continuously switched on and transistors 2b and 2c are continuously switched off for the observation time, by corresponding pulse-width-modulated activation signals at transistor 2d, for example, a defined mean differential voltage may be generated at the outputs 8 and 9. If the two outputs 8 and 9 are connected to a DC motor, a smoothed mean direct current through the windings of the motor 04 will result. For a further observation time, for example, it is possible to generate a direct current having signs reversed to those in the first example, in that transistor 2c is permanently switched on/transistors 2a and 2d are permanently switched off, and a pulse-width-modulated activation of the transistor 2b is performed.

Furthermore, the activation circuit shown in FIG. 1 comprises an emergency operation supply unit 03. This is connected via a network switching element 12 to the intermediate circuit potentials 17 and 18, the network switching element 12 is open in normal operation. If the network switching element 12 is closed, with applied network voltage, the emergency operation supply unit 03 may be charged or, for example, in the event of breakdown of the network voltage, the intermediate circuit may be supplied with voltage with the aid of the emergency operation supply unit 03, so that the connected DC motor 04 and the stopping brake 07 may be operated via the three-phase bridge inverter 01.

Both terminals of the DC motor 04 are connected via an emergency operation motor changeover element 13 to the outputs 8 and 9 of the three-phase bridge inverter 01 on one hand, and to the emergency operation potentials of the emergency operation supply unit 03 on the other hand.

The two terminals of the stopping brake 07 are connected via an emergency operation brake changeover element 14 to one output 10 of the three-phase bridge inverter 01 and to the intermediate circuit potential output 11 and, furthermore, via the emergency operation brake changeover element 14, to the emergency operation potentials of the emergency operation supply unit 03. A stopping brake protective circuit 06 is connected in parallel to the stopping brake 07, which protects the stopping brake 07 from overload. The stopping brake 07 comprises a stopping brake magnetic coil 05. Using this configuration it is possible in particular to predefine the mean coil voltage or the coil currents of the stopping brake 07, even in the event of chronologically changed setpoint value profiles. Thus, for example, by raising the current at the beginning of the activation, more rapid and secure loosening of the brake is possible, while only a reduced current is needed for stopping of the brake. The protective circuit 06 protects the stopping brake magnetic coil 05 of the stopping brake 07 from overvoltages because of switching procedures or parasitic inductances.

In the illustrated configuration, current measuring units 16a, 16b, and 16c, which measure the outgoing currents to the DC motor and to the stopping, brake in normal operation, are connected downstream from the inverter terminal outputs 8, 9, and 10. Therefore, with the aid of the current measuring units 16a, 16b, and 16c, overloads, incorrect behavior, and further operating parameters of stopping brake 07 (by current measuring unit 16c) and motor 04 (by current measuring units 16a, 16b) may be established.

In normal operation, i.e., with applied network voltage and functioning three-phase bridge inverter 01, the network switching element 12 is open or, if the emergency operation supply unit 03 must be charged, closed to charge the chargeable DC voltage source of the emergency operation supply unit 03 with the aid of the intermediate circuit potential voltage UZK+17, UZK–18. The two changeover elements 13 and 14 of the DC motor 04 and the stopping brake 07 connect these consumers to the inverter connection terminals 8, 9, 10 and the stopping brake 07 to the intermediate circuit potential UZK– via the terminal 11. The motor 04 is connected between the half-bridges 02a-02b and 02c-02d, and the stopping brake 07 is connected to the half-bridge 02e-02f and the intermediate circuit potential UZK–18 independently of the motor 04.

If a malfunction occurs, such as a breakdown of the supply network, the emergency operation network switching element 12 may be closed and the emergency operation supply unit 03 may supply the intermediate circuit potentials 17, 18 with voltage. In this case, the two changeover elements 13 and 14 remain in their switching position up to this point and motor 04 and stopping brake 07 remain connected to the three-phase bridge inverter 01.

However, if it is determined by the current measuring units 16a, 16b, and/or 16c that the inverter 01 has broken down, as may occur in the event of a lightning strike, for example, the two emergency operation changeover elements 13 of the motor 04 and 14 of the stopping brake 07 may change over to the emergency operation potentials of the emergency operation supply unit 03. The three-phase bridge inverter 01 is thus decoupled from the two electrical consumers, motor 04 and stopping brake 07. If the emergency operation supply unit 03 is additionally disconnected from the intermediate circuit potentials 17 and 18 by the emergency operation network switching element 12, a non-hazardous replacement of the three-phase bridge inverter 01 may be performed without engaging in the operation of the rotor adjustment device.

In normal operation, the emergency operation network switching element 12 is open to decouple the emergency operation supply unit 03 from the intermediate circuit. Furthermore, the emergency operation network switching element 12 remains open in the startup phase of the activation circuit and after completion of an operational changeover from emergency into normal operation. Only in case of emergency operation, in which DC motor 04 and/or stopping brake 07 are activated via the three-phase bridge inverter 01, and in charging operation, when the emergency operation supply unit 03 is charged via the intermediate circuit potentials 17, 18, is the emergency operation network switching element 12 closed.

In normal operation and in emergency operation via the three-phase bridge inverter 01, the emergency operation motor changeover element 13 connects the DC motor 04 to the output terminals of the three-phase bridge inverter 01. In case of emergency operation with direct activation of the DC motor 04 by the emergency operation supply unit 03, the emergency operation motor changeover element 13 changes the supply terminals of the DC motor 04 over to the emergency operation potentials of the emergency operation supply unit 03.

The emergency operation brake changeover element 04 supplies the stopping brake 07 with current of the three-phase bridge inverter 01 in normal operation and in emergency operation using the three-phase bridge inverter 01. The emergency operation brake changeover element 04 only changes the terminals of the stopping brake 07 over to the emergency operation potentials of the emergency operation supply unit 03 in emergency operation with bypass of the three-phase bridge inverter 01, i.e., with direct activation by the emergency operation supply unit 03.

A monitoring and control device, which is not shown in this figure, may monitor the holding current of the brake 07 and the operating current of the motor 04 in consideration of the currents which are established by the current measuring units 16a, 16b, and 16c, and may thus regulate activation of the half-bridge power switching elements 02 to ensure optimal operation of the adjustment device.

In case of a short-term or longer network breakdown, maintaining all advantageous properties of the drive system, such as regulation of the motor current or dynamic regulation of the coil current of the stopping brake 07, is possible by a reverse supply of the intermediate circuit via the emergency operation network switching element 12 by the emergency operation supply unit 03. In the event of breakdown of the three-phase bridge inverter 01 or the activation electronics of the monitoring and control device, emergency operation may be implemented in that, with open emergency operation network switching element 12 and changeover elements 13 and 14 switched to the emergency operation potential circuit, at least orderly movement of the drive device into a safe standstill position is possible. For reasons of reliability, it may be advisable to provide autonomous electronics for this emergency operation, for example, as a component of the emergency operation supply unit 03, which, at least in case of error, assume the function of the typical control electronics, which are used for activating the half-bridges of the three-phase bridge inverter 01, and independently perform an activation of the switching and changeover elements 12, 13, and 14. Furthermore, it may perform the control of the power switching elements 02 of the three-phase bridge inverter 01. Further auxiliary circuits which ensure power limiting or regulation after closing the changeover contacts 12, 13, or 14, for example, are not shown for reasons of clarity.

Figure 2:
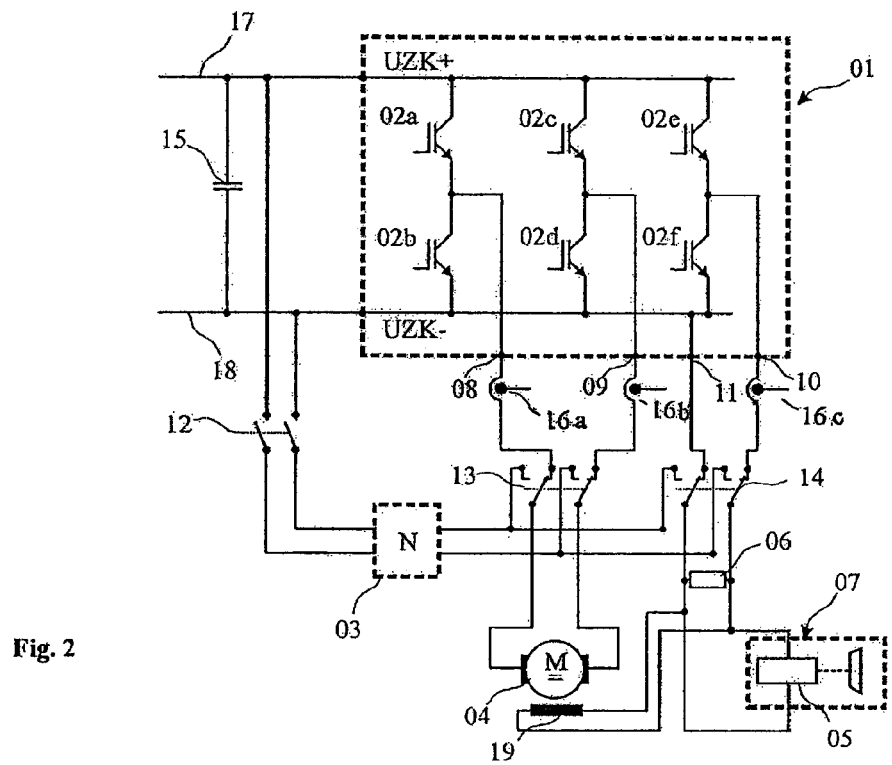
FIG. 2 shows a circuit design of a second embodiment.

A further alternative embodiment of an activation circuit is shown in FIG. 2. The top part of the activation circuit, which comprises the three-phase bridge inverter 01, the intermediate circuit having the potentials 17 and 18, the intermediate circuit capacitor 15, and the emergency operation supply unit 03, the switching element 12, the changeover elements 13 and 14, and the power measuring units 16a, 16b, and 16c, corresponds to the part of the topology shown in FIG. 1. For reasons of clarity, the rectifier bridge circuit for supplying the intermediate circuit by the three phases of the supply network is not shown.

The main attention in the description of this topology is laid on the circuit of the motor 04 in regard to the DC brake 07 and the additional motor shunt winding 19. The DC motor 04 is, as in the embodiment in FIG. 1, connected via the emergency operation motor changeover element 13 to the two half-bridges 02a-02b and 02c-02d of the three-phase bridge inverter 01. Furthermore, it is equipped with a shunt winding 19, which is connected in parallel to the stopping brake 07.

The shunt winding 19 of the motor 04 is active in the open, i.e., powered state of the stopping brake 07. Additional components (not shown) may be connected in series or parallel to the shunt winding and also to the stopping brake magnetic coil 05 of the stopping brake 07, in addition to the stopping brake protective circuit 06. For example, adaptation of the rated voltage of the stopping brake magnetic coil 05 to the required operating voltage of the shunt winding 19 is conceivable. The shunt winding 19 may be operated similarly to an externally-excited winding of a DC motor and excited independently of the operating voltage of the DC motor 04. A high degree of circuit-technology flexibility in operation of the DC motor thus results, because its shunt winding 19 is only a function of the operating voltage of the stopping brake 07. A further circuit-technology degree of freedom in operation of the DC motor 04 is thus provided.

Figure 3:
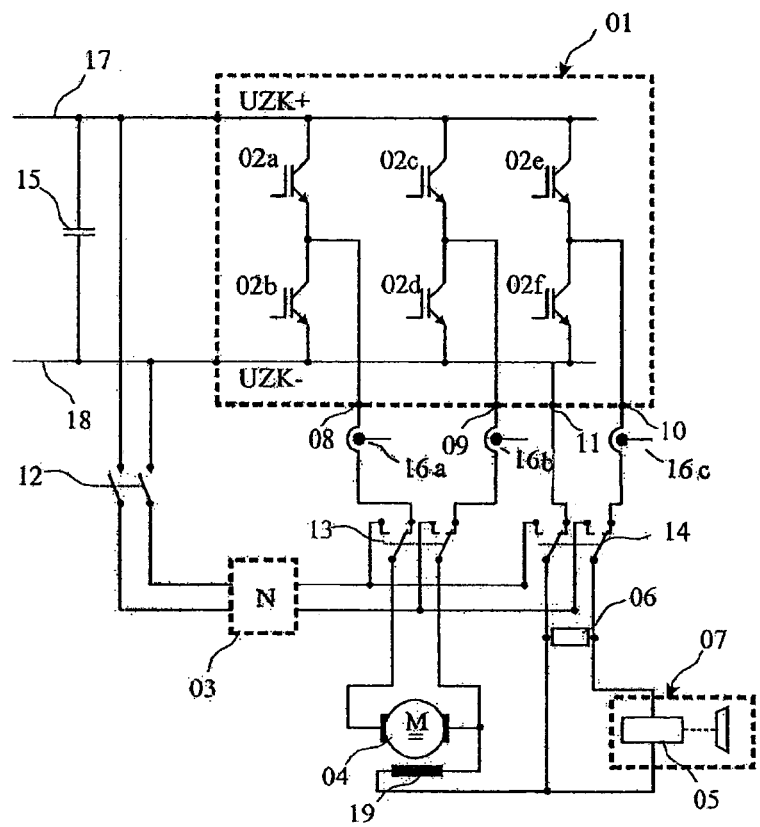
FIG. 3 shows a circuit design of a third embodiment.

The embodiment shown in FIG. 3 differs from the embodiments shown in FIG. 1 and FIG. 2 in regard to the circuit of the DC shunt winding 19 of the DC motor 04. In the implementation shown in FIG. 3, one terminal of the shunt winding 19 is connected to a terminal of the DC motor 04 and the second terminal of the shunt winding 19 is connected to the DC potential terminal of the stopping brake magnetic coil 05 of the stopping brake 07. The shunt winding 19 is thus between the tap 9 of the half-bridge of the inverter 01 formed by the two power switching elements 02c and 02d and the terminal 11 of the intermediate circuit potential UZK−18. Its behavior is directly a function of the activation behavior of the DC motor 04, and thus of the potential difference between the terminals 9 and 11 of the three-phase bridge inverter 01. In this case, the stopping brake 07 may be operated independently of the motor shunt winding 19. Therefore, in specific ranges, the motor 04, the shunt winding 19, and the stopping brake 07 may be activated and regulated independently of one another.

Figure 4:
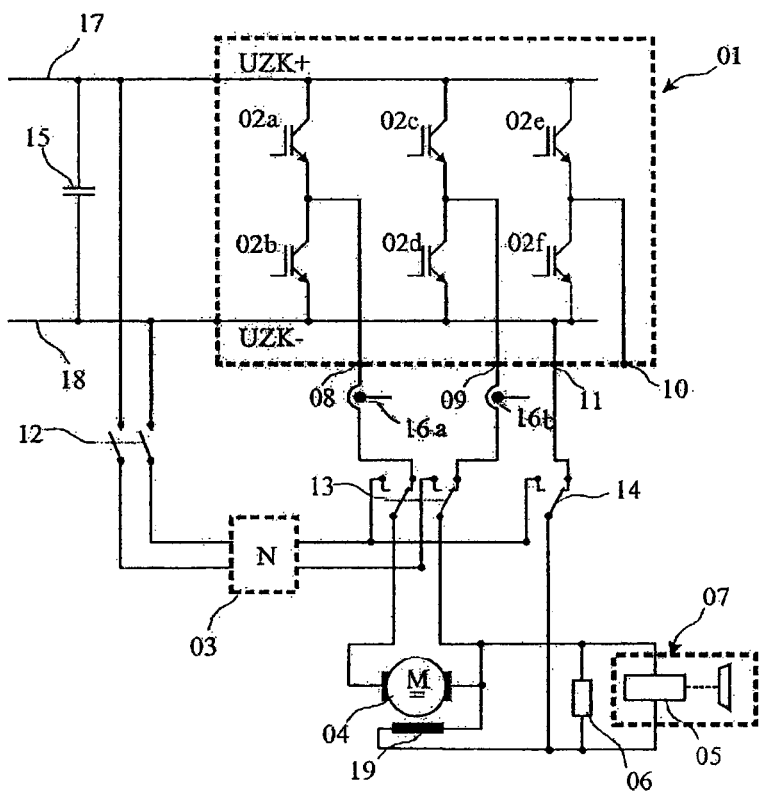
FIG. 4 shows a circuit design of a fourth embodiment.

In a last exemplary embodiment shown in FIG. 4, both DC motor 04 and also shunt winding 19 and stopping brake 07 are connected using at least one terminal to the half-bridge of the three-phase bridge inverter 01 formed by the two power switching elements 02c and 02d via the terminal 9. Corresponding to the exemplary embodiment shown in FIG. 3, the second terminal of the motor shunt winding 19 and the second terminal of the stopping brake 07 via the emergency operation brake changeover element 14 are connected via the terminal 11 to the intermediate circuit potential UZK−18. The advantage of this embodiment is that only two half-bridges of the three-phase bridge inverter are required to operate DC motor 04, shunt winding 19, and stopping brake 07, so that the half-bridge formed by the two power switching elements 02e and 02f remains unused and is thus available for further control or regulating tasks. In this embodiment, the behavior of the stopping brake 07 and the motor shunt winding 19 is a function of one of the two supply lines of the DC motor 04 in relation to the potential UZK−18. Completely independent operation of the three components is thus only possible in a restricted way, but the advantage of a freely available half-bridge results.

Further connection variants are conceivable in regard to the basic idea of the present invention, thus, for example, starting from the circuit configuration shown in FIG. 4, connecting a second DC motor or further additional consumers to the tap W of the unused half-bridge 02e-02f. Furthermore, it is entirely conceivable that only one terminal of the DC motor is connected to a half-bridge and, for example, is connected via a changeover element using the other terminal either to the intermediate circuit potential UZK−18 or to the intermediate circuit potential UZK+17, so that a left, right operation of the motor may be implemented by interposing a polarity reversal element, and activation in regard to the level of the operating voltage would be possible by targeted influencing of the half-bridge. A further half-bridge of the three-phase bridge inverter would thus be saved, this could be used for additional regulating or control tasks. Further circuit variations of this type are conceivable.

We claim:

1. An activation circuit for operating a DC motor having electrically actuated stopping brake, in particular for adjusting a rotor blades of a wind or water power facility, which comprises an emergency operation supply unit and a three-phase bridge inverter, characterized in that the emergency operation supply unit is connected so it is disconnectable via an emergency operation network switching element to the intermediate circuit of the three-phase bridge inverter, the DC motor is connected via an emergency operation motor changeover element either to the three-phase bridge inverter or to the emergency operation supply unit, and the stopping brake is connected via an emergency operation brake changeover element either to the three-phase bridge inverter or to the emergency operation supply unit.

2. The activation circuit according to claim 1, characterized in that the emergency operation supply unit comprises one or more batteries.

3. The activation circuit according to claim 1, characterized in that the emergency operation supply unit comprises a chargeable DC source, in particular one or more accumulators, capacitors, or similar elements.

4. The activation circuit according to claim 3, characterized in that the emergency operation supply unit may be charged via the emergency operation network switching element.

5. The activation circuit according to claim 1, characterized in that the emergency operation supply unit may supply the intermediate circuit of the three-phase bridge inverter in reverse via the emergency operation network switching element directly, or coupled via further components.

6. The activation circuit according to claim 1, characterized in that the activation circuit also comprises a monitoring and control device, which is connected to at least one of the following switching elements: emergency operation network switching element, emergency operation motor changeover element, emergency operation network switching element, and controls at least one of the following functions: power supply of the emergency operation supply unit to and from the intermediate circuit of the inverter, power supply of the DC motor, power supply of the stopping brake.

7. The activation circuit according to claim 6, characterized in that the monitoring and control device is also connected to the three-phase bridge inverter, in order to control it.

8. The activation circuit according to claim 6, characterized in that the monitoring and control device is integrated in the emergency operation supply unit.

9. The activation circuit according to claim 6, characterized in that the monitoring and control device also comprises a remote signaling device for receiving and transmitting information at a remote monitoring and control location.

10. The activation circuit according to claim 6, characterized in that at least one current measuring unit is connected to the monitoring and control device for controlling the inverter and/or the emergency operation network switching element, and/or the emergency operation motor changeover element, and/or the emergency operation brake changeover element.

11. The activation circuit according to claim 10, characterized in that a current measuring unit measures the current of the stopping brake, so that it is possible to regulate the activation current of the stopping brake by the monitoring and control device.

12. The activation circuit according to claim 1, characterized in that the DC motor may be connected via the emergency operation motor changeover element to two half-bridges of the three-phase bridge inverter.

13. The activation circuit according to claim 1, characterized in that at least one terminal of the stopping brake may be connected via the emergency operation brake changeover element to an intermediate circuit potential.

14. The activation circuit according to claim 1, characterized in that at least one terminal of the stopping brake may be connected via the emergency operation brake changeover element to a half-bridge of the three-phase bridge inverter.

15. The activation circuit according to claim 14, characterized in that the half-bridge of the three-phase bridge inverter which is connected to the stopping brake may be switched independently of the two half-bridges of the three-phase bridge inverter which are connected to the DC motor.

16. The activation circuit according to claim 14, characterized in that the half-bridge of the three-phase bridge inverter which is connected to the stopping bridge is one of the half-bridges of the three-phase bridge inverter which are connected to the DC motor.

17. The activation circuit according to claim 14, characterized in that further components, in particular a stopping brake protective circuit, are connected in parallel and/or in series to the stopping brake.

18. The activation circuit according to claim 14, characterized in that the stopping brake is operated during operation via the inverter using a chronologically changeable voltage mean value, in particular using a pulse-width-modulated voltage.

19. The activation circuit according to claim 14, characterized in that the activation circuit also comprises at least one current measuring unit.

20. The activation circuit according to claim 19, characterized in that at least one current measuring unit is integrated in the three-phase bridge inverter.

21. The activation circuit according to claim 19 characterized in that at least one current measuring unit is connected to the monitoring and control device for controlling the inverter and/or the emergency operation network switching element, and/or the emergency operation motor changeover element, and/or the emergency operation brake changeover element.

22. The activation circuit according to claim 1, characterized in that the DC motor comprises a motor shunt winding.

23. The activation circuit according to claim 22, characterized in that the motor shunt winding is connected in parallel to the stopping brake.

24. The activation circuit according to claim 22, characterized in that the motor shunt winding is connected as an externally-excited winding of the DC motor.

25. The activation circuit according to claim 22, characterized in that the motor shunt winding is connected between a terminal of the DC motor and the terminal of the stopping brake.

26. The activation circuit according to claim 22, characterized in that additional components are connected in series and/or parallel to the motor shunt winding.

27. The activation circuit according to claim 1, characterized in that the DC motor comprises a field rectifier.

28. The activation circuit according to claim 1, characterized in that the three-phase bridge inverter is part of a voltage intermediate circuit converter or servo control.

29. The activation circuit according claim 1, characterized in that each half-bridge of the inverter comprises at least two insulated gate bipolar transistors (IGBTs) as power switching elements.

30. A method for operating an activation circuit for operating a DC motor having electrically actuated stopping brake, in particular for adjusting a rotor blades of a wind or water power facility, which comprises an emergency operation supply unit and a three-phase bridge inverter, wherein the emergency operation supply unit is connected so it is disconnectable via an emergency operation network switching element to the intermediate circuit of the three-phase bridge inverter, the DC motor is connected via an emergency operation motor changeover element either to the three-phase bridge inverter or to the emergency operation supply unit, and the stopping brake is connected via an emergency operation brake changeover element either to the three-phase bridge inverter or to the emergency operation supply unit, characterized in that, in normal operation, the emergency operation network switching element is closed as needed for charging the emergency operation supply unit by the intermediate circuit and is otherwise open, the emergency operation motor changeover element connects the DC motor to the three-phase bridge inverter, and the emergency operation brake changeover element connects the stopping brake to the three-phase bridge inverter; in first emergency operation, in which the three-phase bridge inverter is used, the emergency operation network switching element is closed to supply the intermediate circuit with voltage, the emergency operation motor changeover element connects the DC motor to the three-phase bridge inverter, and the emergency operation brake changeover element connects the stopping brake to the three-phase bridge inverter; and, in second emergency operation, in which the three-phase bridge inverter is bypassed, the emergency operation network switching element is open, the emergency operation motor changeover element connects the DC motor to the emergency operation supply unit, and the emergency operation brake changeover element connects the stopping brake to the emergency operation supply unit.

31. The method according to claim 30, characterized in that the monitoring and control device performs the control of the individual operation types normal operation, first emergency operation, and second emergency operation.

32. The method according to claim 31, characterized in that the monitoring and control device also controls the power switching elements of the half-bridges of the three-phase bridge inverter.

33. The method according to claim 32, characterized in that the control of the power switching elements is performed in consideration of the measured data of at least one current measuring unit.

34. The method according to claim 30, characterized in that the selection of the individual operation types normal operation, first emergency operation, and second emergency operation is performed in consideration of the measured data of at least one current measuring unit.

35. The method according to claim 30, characterized in that the monitoring and control device compares the current measured by at least one of the current measuring units to stored setpoint profiles and ascertains information about function state, malfunction, aging, wear, strain, and/or similar states of the DC motor and/or the stopping brake therefrom.

* * * * *